United States Patent
Hoffman

(10) Patent No.: US 6,907,101 B2
(45) Date of Patent: Jun. 14, 2005

(54) CT DETECTOR WITH INTEGRATED AIR GAP

(75) Inventor: David M. Hoffman, New Berlin, WI (US)

(73) Assignee: General Electric Company, Milwaukee, WI (US)

( * ) Notice: Subject to any disclaimer, the term of this patent is extended or adjusted under 35 U.S.C. 154(b) by 212 days.

(21) Appl. No.: 10/248,929

(22) Filed: Mar. 3, 2003

(65) Prior Publication Data

US 2004/0174951 A1 Sep. 9, 2004

(51) Int. Cl.[7] .................................................. G21K 1/12
(52) U.S. Cl. .................. 378/19; 378/98.8; 250/370.09; 250/370.11
(58) Field of Search .............................. 378/4, 19, 98.8; 250/370.09, 370.11

(56) References Cited

U.S. PATENT DOCUMENTS 4,454,424 A * 6/1984 Strauss et al. ......... 250/390.11
4,636,644 A * 1/1987 Stokes ......................... 250/368
4,639,600 A * 1/1987 Laurer .................... 250/363.01
6,327,329 B1 * 12/2001 Bromberg et al. ............. 378/19

OTHER PUBLICATIONS

Http://www.sunpowercorp.com/Pegasus_datasheet.htm.

* cited by examiner

*Primary Examiner*—Craig E. Church
*Assistant Examiner*—Irakli Kiknadze
(74) *Attorney, Agent, or Firm*—Ziolkowski Patent Solutions Group, SC; Michael A. Della Penna; Carl B. Horton

(57) ABSTRACT

The present invention is directed to an improved CT detector scintillator to photodiode optical coupling. The CT detector utilizes a controlled air gap between the photodiode array and the scintillator array together with an anti-reflective layer on the scintillator array. To improve the absorption of light at the photodiode array, the photodiode array includes a textured light reception surface. By incorporating a textured layer with the photodiode array, the light collection efficiency of the photodiodes is improved. The textured layer may extend along an x- and/or z-axis and the texturing may be in different forms. For example, the textured layer may include a series of pyramidally-shaped protrusions.

24 Claims, 5 Drawing Sheets

CT DETECTOR WITH INTEGRATED AIR GAP

BACKGROUND OF THE INVENTION

The present invention relates generally to diagnostic imaging and, more particularly, to a CT detector with an integrated air gap. More particularly, the CT detector includes a scintillator array having an anti-reflective layer is attached to a photodiode array having a textured surface such that a controlled air gap exists therebetween.

Typically, in computed tomography (CT) imaging systems, an x-ray source emits a fan-shaped beam toward a subject or object, such as a patient or a piece of luggage. Hereinafter, the terms "subject" and "object" shall include anything capable of being imaged. The beam, after being attenuated by the subject, impinges upon an array of radiation detectors. The intensity of the attenuated beam radiation received at the detector array is typically dependent upon the attenuation of the x-ray beam by the subject. Each detector element of the detector array produces a separate electrical signal indicative of the attenuated beam received by each detector element. The electrical signals are transmitted to a data processing system for analysis which ultimately produces an image.

Generally, the x-ray source and the detector array are rotated about the gantry within an imaging plane and around the subject. X-ray sources typically include x-ray tubes, which emit the x-ray beam at a focal point. X-ray detectors typically include a collimator for collimating x-ray beams received at the detector, a scintillator for converting x-rays to light energy adjacent the collimator, and photodiodes for receiving the light energy from the adjacent scintillator and producing electrical signals therefrom.

Typically, each scintillator of a scintillator array converts x-rays to light energy. Each scintillator discharges light energy to a photodiode adjacent thereto. Each photodiode detects the light energy and generates a corresponding electrical signal. The outputs of the photodiodes are then transmitted to the data processing system for image reconstruction.

Known CT detectors utilize a contiguous layer of epoxy to optically couple the photodiode array to the scintillator array. This layer of epoxy is generally referred as an "opticoupler". The opti-coupler must be of sufficient adhesion strength to maintain a consistent bond between the photodiode array and scintillator array along both the width and length of the arrays. That is, the opti coupler must be formed of a composite that is able to withstand the stress induced in the scintillator and photodiode arrays that result when materials with similar thermal coefficients of expansion are coupled to one another.

Advancements have been made in opti-coupler design and fabrication to withstand the stress associated with coupling materials with different thermal expansion characteristics to one another. Despite these advancements, known opticouplers remain susceptible to cracking or breaking away from the scintillator and/or photodiode array. This premature cracking or breaking away can result in catastrophic failure of the CT detector thereby warranting full detector replacement and downtime of the CT system.

Therefore, it would be desirable to design a CT detector wherein the photodiode array and scintillator array are coupled to one another absent a contiguous optical coupling epoxy layer.

BRIEF DESCRIPTION OF INVENTION

The present invention is directed to an improved CT detector scintillator to photodiode optical coupling that overcomes the aforementioned drawbacks. The CT detector utilizes a controlled air gap between the photodiode array and the scintillator array together with an anti-reflective layer on the scintillator array. To improve the absorption of light at the photodiode array, the photodiode array includes a textured light reception surface. By incorporating a textured layer with the photodiode array, the light collection efficiency of the photodiodes is improved. The textured layer may extend along an x and/or z-axis and the texturing may be in different forms. For example, the textured layer may include a series of pyramidally-shaped protrusions.

Therefore, in accordance with one aspect of the present invention, a CT detector includes an array of scintillators configured to convert received x-rays to light. The CT detector further includes an array of light detection elements in operable association with the array of scintillators and configured to output electrical signals in response to light detected from the array of scintillators. An air gap is disposed between the array of scintillators and the array of light detection elements.

In accordance with another aspect of the present invention, a CT detector for an imaging system is formed by arranging a plurality of light detection elements in an array as well as arranging a plurality of scintillators in an array. At least one anti-reflective layer is then affixed to the scintillator arrays whereupon the arrays are coupled to one another such that a uniform air gap extends therebetween.

According to another aspect of the present invention, a CT system includes a rotatable gantry having a bore centrally disposed therein and a table movable fore and aft through the bore and configured to position a subject for CT data acquisition. A high frequency electromagnetic energy projection source is positioned within the rotatable gantry and configured to project high frequency electromagnetic energy toward the subject. The CT system further includes a detector array disposed within the rotatable gantry and configured to detect high frequency electromagnetic energy projected by the projection source and impinged by the subject. The detector array includes a scintillator array having an anti-reflective layer coupled thereto and a photodiode array coupled to the scintillator array such that a uniform gap extends therebetween.

In accordance with yet a further aspect of the present invention, a CT detector includes a scintillator array of scintillators having a light output surface configured to emit light and a photodiode array of photo-sensitive elements configured to detect light emitted by the scintillator array and output electrical signals indicative of the light detected. The photodiode array is constructed to have a non-planar light detection surface.

According to a further aspect of the present invention, a CT detector includes a means for outputting light based on detected x-rays as well as means for preventing light reflection coupled to the means for outputting. The CT detector further includes means for detecting light output by the means for outputting and coupled to the means for preventing such that a uniform air gap extends therebetween.

Various other features, objects and advantages of the present invention will be made apparent from the following detailed description and the drawings.

BRIEF DESCRIPTION OF DRAWINGS

The drawings illustrate one preferred embodiment presently contemplated for carrying out the invention.

In the drawings.

DETAILED DESCRIPTION

The operating environment of the present invention is described with respect to a four-slice computed tomography (CT) system. However, it will be appreciated by those skilled in the art that the present invention is equally applicable for use with single-slice or other multi-slice configurations. Moreover, the present invention will be described with respect to the detection and conversion of x-rays. However, one skilled in the art will further appreciate that the present invention is equally applicable for the detection and conversion of other high frequency electromagnetic energy. The present invention will be described with respect to a "third generation" CT scanner, but is equally applicable with other CT systems.

Figure 1:
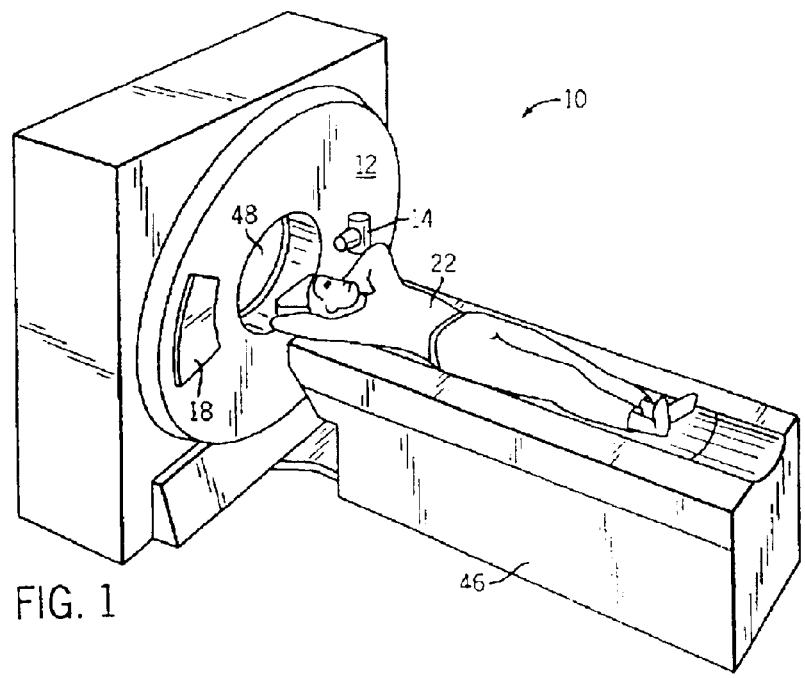
FIG. 1 is a pictorial view of a CT imaging system.
Figure 2:
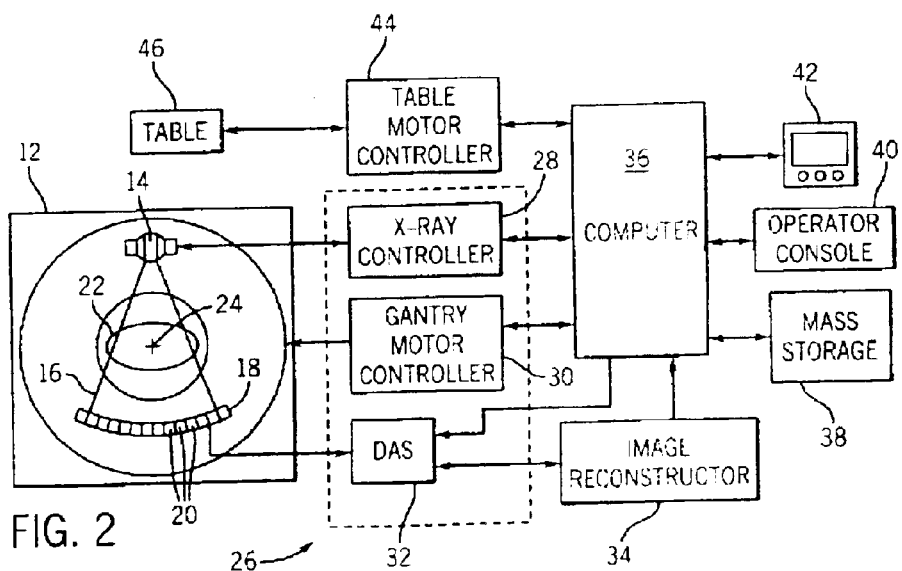
FIG. 2 is a block schematic diagram of the system illustrated in FIG. 1.

Referring to FIGS. 1 and 2, a computed tomography (CT) imaging system 10 is shown as including a gantry 12 representative of a "third generation" CT scanner. Gantry 12 has an x-ray source 14 that projects a beam of x-rays 16 toward a detector array 18 on the opposite side of the gantry 12. Detector array 18 is formed by a plurality of detectors 20 which together sense the projected x-rays that pass through a medical patient 22. Each detector 20 produces an electrical signal that represents the intensity of an impinging x-ray beam and hence the attenuated beam as it passes through the patient 22. During a scan to acquire x-ray projection data, gantry 12 and the components mounted thereon rotate about a center of rotation 24.

Rotation of gantry 12 and the operation of x-ray source 14 are governed by a control mechanism 26 of CT system 10. Control mechanism 26 includes an x-ray controller 28 that provides power and timing signals to an x-ray source 14 and a gantry motor controller 30 that controls the rotational speed and position of gantry 12. A data acquisition system (DAS) 32 in control mechanism 26 samples analog data from detectors 20 and converts the data to digital signals for subsequent processing. An image reconstructor 34 receives sampled and digitized x-ray data from DAS 32 and performs high speed reconstruction. The reconstructed image is applied as an input to a computer 36 which stores the image in a mass storage device 38.

Computer 36 also receives commands and scanning parameters from an operator via console 40 that has a keyboard. An associated cathode ray tube display 42 allows the operator to observe the reconstructed image and other data from computer 36. The operator supplied commands and parameters are used by computer 36 to provide control signals and information to DAS 32, x-ray controller 28 and gantry motor controller 30. In addition, computer 36 operates a table motor controller 44 which controls a motorized table 46 to position patient 22 and gantry 12. Particularly, table 46 moves portions of patient 22 through a gantry opening 48.

Figure 3:
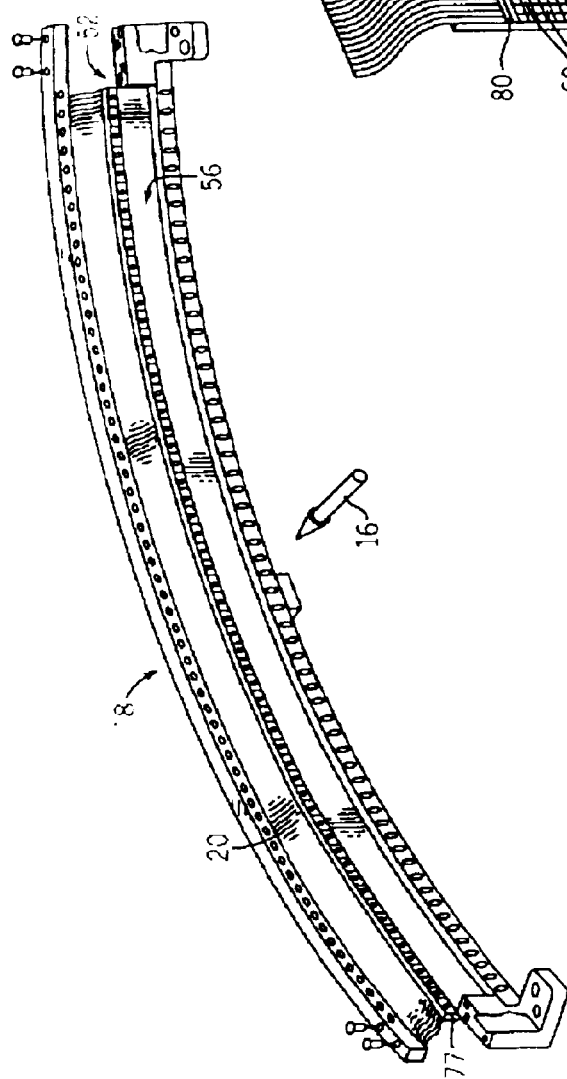
FIG. 3 is a perspective view of one embodiment of a CT system detector array.
Figure 4:
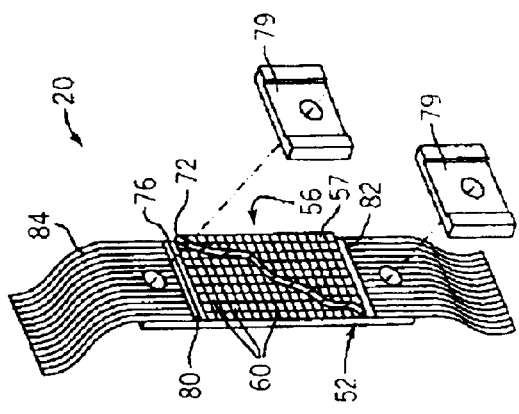
FIG. 4 is a perspective view of one embodiment of a detector.

As shown in FIGS. 3 and 4, detector array 18 includes a plurality of scintillators 57 forming a scintillator array 56. A collimator (not shown) is positioned above scintillator array 56 to collimate x-ray beams 16 before such beams impinge upon scintillator array 56.

In one embodiment, shown in FIG. 3, detector array 18 includes 57 detectors 20, each detector 20 having an array size of 16×16. As a result, array 18 has 16 rows and 912 columns (16×57 detectors) which allows 16 simultaneous slices of data to be collected with each rotation of gantry 12.

Switch arrays 80 and 82, FIG. 4, are multi-dimensional semiconductor arrays coupled between scintillator array 56 and DAS 32. Switch arrays 80 and 82 include a plurality of field effect transistors (FET) (not shown) arranged as multi-dimensional array. The FET array includes a number of electrical leads connected to each of the respective photodiodes 60 and a number of output leads electrically connected to DAS 32 via a flexible electrical interface 84. Particularly, about one-half of photodiode outputs are electrically connected to switch 80 with the other one-half of photodiode outputs electrically connected to switch 82. Additionally, a reflector layer (not shown) may be interposed between each scintillator 57 to reduce light scattering from adjacent scintillators. Each detector 20 is secured to a detector frame 77, FIG. 3, by mounting brackets 79.

Switch arrays 80 and 82 further include a decoder (not shown) that enables, disables, or combines photodiode outputs in accordance with a desired number of slices and slice resolutions for each slice. Decoder, in one embodiment, is a decoder chip or a FET controller as known in the art. Decoder includes a plurality of output and control lines coupled to switch arrays 80 and 82 and DAS 32. In one embodiment defined as a 16 slice mode, decoder enables switch arrays 80 and 82 so that all rows of the photodiode array 52 are activated, resulting in 16 simultaneous slices of data for processing by DAS 32. Of course, many other slice combinations are possible. For example, decoder may also select from other slice modes, including one, two, and four-slice modes.

Figure 5:
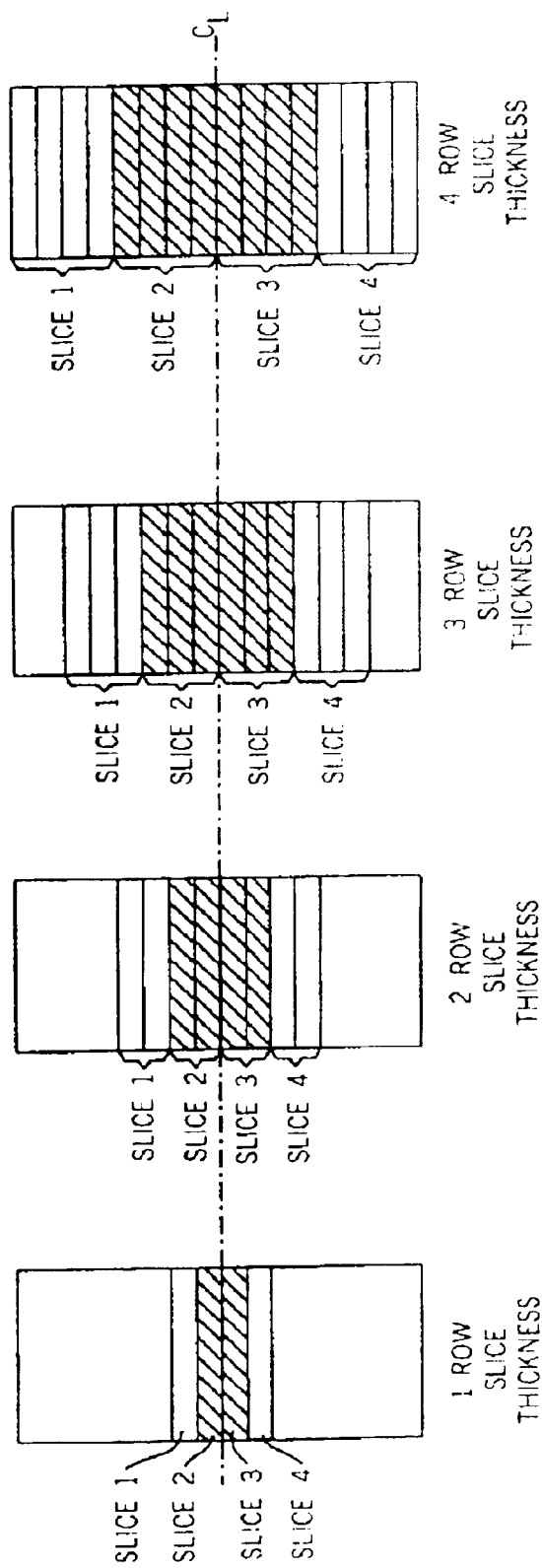
FIG. 5 is illustrative of various configurations of the detector in FIG. 4 in a four-slice mode.

As shown in FIG. 5, by transmitting the appropriate decoder instructions, switch arrays 80 and 82 can be configured in the four-slice mode so that the data is collected from four slices of one or more rows of photodiode array 52. Depending upon the specific configuration of switch arrays 80 and 82, various combinations of photodiodes 60 can be enabled, disabled, or combined so that the slice thickness may consist of one, two, three, or four rows of scintillator array elements 57. Additional examples include, a single slice mode including one slice with slices ranging from 1.25 mm thick to 20 mm thick, and a two slice mode including two slices with slices ranging from 1.25 mm thick to 10 mm thick. Additional modes beyond those described are contemplated.

Figure 6:
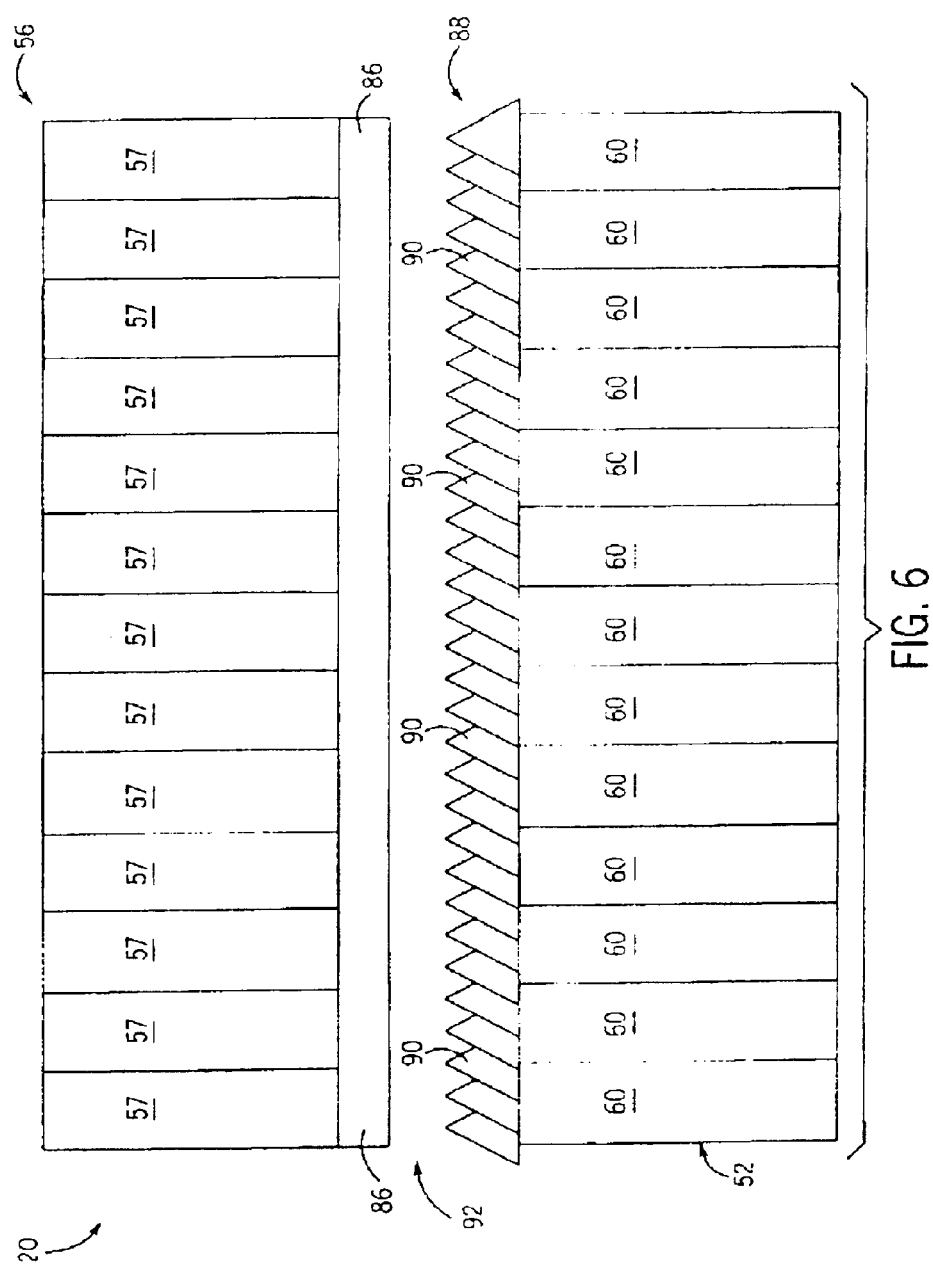
FIG. 6 is a schematic of a cross-section of a CT detector in accordance with the present invention.

Referring now to FIG. 6, a schematic cross-section of a CT detector 20 in accordance with the present invention is shown. As previously described, CT detector 20 includes a scintillator array 56 formed by a plurality of scintillators 57. Coupled to the scintillator array 56 is an anti-reflective layer 86. Anti-reflective layer 86 may include a single or multiple layers of anti-reflective material and may be in the form of a film, resin, or the like. Anti-reflective layer 86 operates to facilitate light exiting from the scintillator array so as to improve light detection by photodiode 60 of photodiode array 52.

Photodiode array 52 includes a textured layer 88 designed to maximize absorption of light emitted by the scintillator array 56 and transfer the light to photodiode array 52. Integrating a textured surface 88 on photodiode array 52 improves the light collection efficiency of the photodiodes 60. The texturing of layer or surface 88 may take many forms and fabricate it in accordance with a number of manufactured techniques. For example, as illustrated in FIG. 6, textured layer surface 88 may be diced, etched, molded, or cut such that a series of pyramidally-shaped protrusions 90 are formed. However, one skilled in the art will appreciate that other shaped protrusions may be implemented and other fabricating processes may be implemented.

CT detector 20 is constructed such that an air gap 92 extends between the anti-reflective layer 86 affixed to scintillator array 56 and the textured surface 88 affixed to photodiode array 52. Air gap 92 is a controlled air gap in that the depth of the air gap is consistent along the width and length of the photodiode and scintillator arrays. The air gap is designed to allow thermal expansion of the components of the CT detector under various heat loads without causing stress-induced fractures on either array. Preferably, the depth of air gap 92 is minimized to reduce optical cross-talk between adjacent scintillators and photodiodes.

CT detector 20 may be fabricated or manufactured in accordance with a number of techniques. For example, anti-reflective layer 86 may be applied as a film by sputtering, vapor deposition and other processes and allowed to seal against the light emission surface of scintillator array 56 or applied as a resin and allowed to cure. Textured surface 88 may be integrated with the surface of each photodiode 60 or separately applied as a composite material to improve the light collection of the photodiodes 60 secured thereto. Photodiode array 52 is secured to scintillator array 56 using the various attachment and coupling mechanisms such that air gap 92 is formed therebetween. As stated above, it is preferable to minimize the depth of air gap 92, but air gap 92 should be of sufficient depth to maintain an air separation between the anti-reflective layer of the scintillator array and the textured surface of the photodiode array. The textured surface may incorporate a number of shaped protrusions including the pyramidally-shaped protrusions illustrated in FIG. 6. Those shapes may be formed by dicing, etching, molding, or cutting a block of composite material or formed during a casting process.

Figure 7:
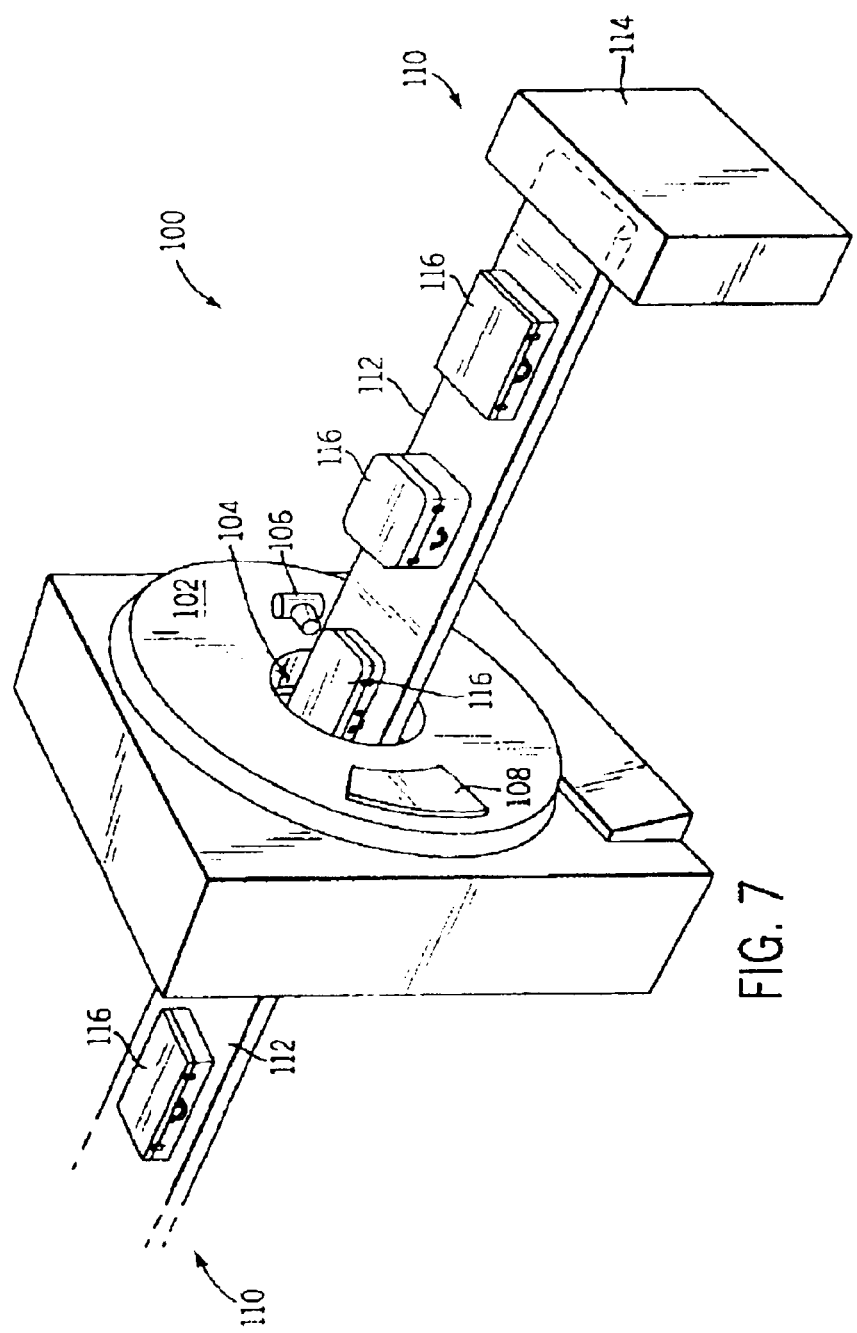
FIG. 7 is a pictorial view of a CT system for use with a non-invasive package inspection system.

Referring now to FIG. 7, package/baggage inspection system 100 includes a rotatable gantry 102 having an opening 104 therein through which packages or pieces of baggage may pass. The rotatable gantry 102 houses a high frequency electromagnetic energy source 106 as well as a detector assembly 108 having a plurality of detector cells similar to that shown in FIGS. 3 and 4. A conveyor system 110 is also provided and includes a conveyor belt 112 supported by structure 114 to automatically and continuously pass packages or baggage pieces 116 through opening 104 to be scanned. Objects 116 are fed through opening 104 by conveyor belt 112, imaging data is then acquired, and the conveyor belt 112 removes the packages 116 from opening 104 in a controlled and continuous manner. As a result, postal inspectors, baggage handlers, and other security personnel may non-invasively inspect the contents of packages 116 for explosives, knives, guns, contraband, etc.

Therefore, in accordance with one embodiment of the present invention, a CT detector includes an array of scintillators configured to convert received x-rays to light. The CT detector further includes an array of light detection elements in operable association with the array of scintillators and configured to output electrical signals in response to light detected from the array of scintillators. An air gap is disposed between the array of scintillators and the array of light detection elements.

In accordance with another embodiment of the present invention, a CT detector for an imaging system is formed by arranging a plurality of light detection elements in an array as well as arranging a plurality of scintillators in an array. At least one anti-reflective layer is then affixed to the scintillator arrays whereupon the arrays are coupled to one another such that a uniform air gap extends therebetween.

According to another embodiment of the present invention, a CT system includes a rotatable gantry having a bore centrally disposed therein and a table movable fore and aft through the bore and configured to position a subject for CT data acquisition. A high frequency electromagnetic energy projection source is positioned within the rotatable gantry and configured to project high frequency electromagnetic energy toward the subject. The CT system further includes a detector array disposed within the rotatable gantry and configured to detect high frequency electromagnetic energy projected by the projection source and impinged by the subject. The detector array includes a scintillator array having an anti-reflective layer coupled thereto and a photodiode array coupled to the scintillator array such that a uniform gap extends therebetween.

In accordance with yet a further embodiment of the present invention, a CT detector includes a scintillator array of scintillators having a light output surface configured to emit light and a photodiode array of photo-sensitive elements configured to detect light emitted by the scintillator array and output electrical signals indicative of the light detected. The photodiode array is constructed to have a non-planar light detection surface.

According to a further embodiment of the present invention, a CT detector includes a means for outputting light based on detected x-rays as well as means for preventing light reflection coupled to the means for outputting. The CT detector further includes means for detecting light output by the means for outputting and coupled to the means for preventing such that a uniform air gap extends therebetween.

The present invention has been described in terms of the preferred embodiment, and it is recognized that equivalents, alternatives, and modifications, aside from those expressly stated, are possible and within the scope of the appending claims.

What is claimed is:

1. A CT detector comprising:
   an array of scintillators configured to convert received x-rays to light;
   an array of light detection elements in operable association with the array of scintillators and configured to output electrical signals in response to light detected from the array of scintillators, the array of light detection elements including a textured layer to receive the light emitted by the array of scintillators; and
   an air gap disposed between the array of scintillators and the array of light detection elements.

2. The CT detector of claim 1 further comprising an anti-reflective layer coupled to the array of scintillators.

3. The CT detector of claim 1 wherein the textured layer includes a series of pyramidal protrusions extending along a top surface of the array of light detection elements.

4. The CT detector of claim 1 wherein the array of scintillators are two-dimensionally arranged.

5. The CT detector of claim 1 wherein the array of light detection elements are two-dimensionally arranged.

6. The CT detector of claim 1 incorporated into a medical imaging scanner.

7. A CT detector for an imaging system, the CT detector formed by:
    arranging a plurality of light detection elements in an array, the light detection elements having a non-planar light detection surface;
    arranging a plurality of scintillators in an array;
    affixing at least one anti-reflective layer to the array of scintillators; and
    coupling the arrays to one another such that a uniform air gap extends therebetween.

8. The CT detector of claim 7 further formed by texturing a top surface of the array of light detection elements such that the top surface is non-planar.

9. The CT detector of claim 8 further formed by creating a series of pyramidally-shaped protrusions in the top surface.

10. The CT detector of claim 9 further formed by creating the series of pyramidally-shaped protrusions along an entire width and length of the top surface.

11. The CT detector of claim 7 further formed by arranging the arrays two-dimensionally along an x-z axis.

12. A CT system comprising:
    a rotatable gantry having a bore centrally disposed therein;
    a table movable fore and aft through the bore and configured to position a subject for CT data acquisition;
    a high frequency electromagnetic energy projection source positioned within the rotatable gantry and configured to project high frequency electromagnetic energy toward the subject; and
    a detector array disposed within the rotatable gantry and configured to detect high frequency electromagnetic energy projected by the projection source and impinged by the subject, the detector array including:
        a scintillator array having an anti-reflective layer coupled thereto; and
        a photodiode diode array coupled to the scintillator array such that a non-planar gap extends between the reflective layer and the photodiode array.

13. The CT system of claim 12 further comprising a DAS connected to the photodiode array and configured to receive electrical signals from the photodiode array indicative of the high frequency electromagnetic energy received by the detector array.

14. The CT system of claim 13 wherein the photodiode array includes a non-planar layer.

15. The CT system of claim 14 wherein the non-planar layer includes a series of protrusions extending along an entire length and width of the photodiode array.

16. The CT system of claim 15 wherein each of the protrusions is pyramidally-shaped.

17. The CT system of claim 12 wherein the detector array is two-dimensionally arranged.

18. The CT system of claim 12 incorporated into a medical imaging scanner.

19. The CT system of claim 12 incorporated into a parcel inspection apparatus.

20. A CT detector comprising:
    a scintillator array of scintillators having a light output surface configured to emit light upon receipt of x-rays; and
    a photodiode array of photosensitive elements configured to detect light emitted by the scintillator array and output electrical signals indicative of light detected, the photodiode array having a non-planar light detection surface.

21. The CT detector of claim 20 wherein the scintillator array includes an anti-reflective layer coupled to the light output surface.

22. The CT detector of claim 21 further comprising a uniform air gap disposed between the anti-reflective layer and the non-planar light detection surface.

23. The CT detector of claim 20 wherein the non-planar light detection surface includes a series of pyramidally-shaped protrusions extending along an entire length and width thereof.

24. A CT detector comprising:
    means for outputting light based on detected x-rays;
    means for preventing light reflection coupled to the means for outputting;
    means for detecting light output by the means for outputting and coupled to the means for preventing such that a non-uniform air gap extends therebetween.

* * * * *